(12) United States Patent
Melapudi et al.

(10) Patent No.: US 10,690,585 B2
(45) Date of Patent: Jun. 23, 2020

(54) SYSTEM AND METHOD FOR DETECTING AN ANOMALY IN A PIPE ASSEMBLY

(71) Applicant: General Electric Company, Schenectady, NY (US)

(72) Inventors: Vikram Reddy Melapudi, Bangalore (IN); Megha Navalgund, Bangalore (IN); Manikandasriram Srinivasan Ramanagopal, Chennai (IN); Prafull Sharma, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/518,187

(22) PCT Filed: Sep. 15, 2015

(86) PCT No.: PCT/US2015/050117
§ 371 (c)(1),
(2) Date: Apr. 10, 2017

(87) PCT Pub. No.: WO2016/057165
PCT Pub. Date: Apr. 14, 2016

(65) Prior Publication Data
US 2017/0241895 A1   Aug. 24, 2017

(30) Foreign Application Priority Data
Oct. 9, 2014  (IN) ............... 5087/CHE/2014

(51) Int. Cl.
*G01N 17/00* (2006.01)
*G01N 27/20* (2006.01)
(Continued)

(52) U.S. Cl.
CPC ............ *G01N 17/006* (2013.01); *G01M 3/18* (2013.01); *G01M 3/40* (2013.01); *G01N 27/20* (2013.01)

(58) Field of Classification Search
CPC ...... G01N 17/00; G01N 17/006; G01N 27/00; G01N 27/02; G01N 27/04; G01N 27/20;
(Continued)

(56) References Cited

U.S. PATENT DOCUMENTS 3,220,714 A * 11/1965 Spence ................ F27B 7/2075
15/104.07
4,352,065 A    9/1982 Rogachev et al.
(Continued)

FOREIGN PATENT DOCUMENTS

WO        99/50614 A1     10/1999
WO     WO 9950614 A1 *   10/1999  ............... G01B 7/06
WO     2013/192536 A1    12/2013

OTHER PUBLICATIONS

Jones et al., "Use of microwaves for the detection of water as a cause of corrosion under insulation," Journal of NonDestructive Evaluation, vol. 31, No. 1, pp. 65-76, (2012).
(Continued)

*Primary Examiner* — Huy Q Phan
*Assistant Examiner* — David B Frederiksen
(74) *Attorney, Agent, or Firm* — Mintz Levin Cohn Ferris Glovsky and Popeo, P.C.

(57) ABSTRACT

A system includes a plurality of movable members and an electromagnetic wave probe disposed within at least one movable member among the plurality of movable members. The actuation system is coupled to the plurality of movable members. The actuation system is configured to actuate and removably position the plurality of movable members to form a wave guide around at least a portion of an outer
(Continued)

peripheral surface of the pipe assembly and position the electromagnetic wave probe proximate to the portion of the outer peripheral surface of the pipe assembly.

19 Claims, 9 Drawing Sheets

(51) Int. Cl.
     *G01M 3/18*     (2006.01)
     *G01M 3/40*     (2006.01)

(58) Field of Classification Search
     CPC .......... G01M 3/16; G01M 3/165; G01M 3/18; G01M 3/40; G01R 31/08
     See application file for complete search history.

(56) References Cited

U.S. PATENT DOCUMENTS

| | | | |
|---|---|---|---|
| 5,619,423 A | 4/1997 | Scrantz | |
| 5,905,194 A | 5/1999 | Strong | |
| 6,005,396 A * | 12/1999 | Suyama | G01N 22/02 324/528 |
| 6,194,902 B1 | 2/2001 | Kuo et al. | |
| 6,751,560 B1 * | 6/2004 | Tingley | G01N 22/02 702/51 |
| 6,925,145 B2 | 8/2005 | Batzinger et al. | |
| 8,356,518 B2 | 1/2013 | Alleyne et al. | |
| 8,619,134 B2 | 12/2013 | Christ | |
| 9,207,192 B1 * | 12/2015 | Focia | G01N 23/00 |
| 2001/0037675 A1 | 11/2001 | Kuo | |
| 2002/0005812 A1 | 1/2002 | Kuo et al. | |
| 2007/0126421 A1 * | 6/2007 | Barnes | G01M 3/18 324/238 |
| 2008/0191706 A1 * | 8/2008 | Burnett | G01N 27/20 324/533 |
| 2010/0171483 A1 * | 7/2010 | Frost | G01N 17/006 324/71.1 |
| 2011/0209540 A1 | 9/2011 | Banks et al. | |

OTHER PUBLICATIONS

Palmer-Jones, R. and Paisley, D., "Repairing Internal Corrosion Defects in Pipelines," 4th International Pipeline Rehabilitation and Maintenance Conference, PENSPEN, pp. 1-25, (Sep. 2000).

Venugopal et al., Method, System and Apparatus for Detecting an Anomaly in a Pipe, GE co-pending Application No. 1223/CHE/2012, filed on Mar. 29, 2012.

Qiang, W. and Xiaowei, W., "Interferometeric Fibre Optic Signal Processing Based on Wavelet Transform for Subsea Gas Pipeline Leakage Inspection," 2010 International Conference on Measuring Technology and Mechatronics Automation (ICMTMA), vol. 2, pp. 501-504, (Mar. 2010)

International Search Report and Written Opinion issued in connection with corresponding PCT Application No. PCT/US2015/050117 dated Jan. 7, 2016.

International Preliminary Report on Patentability issued in connection with corresponding PCT Application No. PCT/US2015/050117 dated Apr. 11, 2017.

\* cited by examiner

SYSTEM AND METHOD FOR DETECTING AN ANOMALY IN A PIPE ASSEMBLY

BACKGROUND

The invention relates generally to detection systems for detecting anomalies in pipes, and more particularly to an electromagnetic detection system for detecting anomalies in a non-cladded pipe assembly.

Many industries, such as chemical industries, petroleum industries, use pipeline systems for various purposes. One such purpose is for transportation of materials such as chemicals, fuel, and the like. Such pipeline systems may be laid underwater, under soil, or on land. In many cases, pipes in the pipeline systems are insulated and/or shielded to protect the pipes from corrosion, physical damages, and the like. Despite the shielding, one or more anomalies may occur in the pipes due to various reasons including damages in shielding, environmental factors, prior existence of corrosion factors within the shielding, and external forces, among others. The anomalies may eventually degrade and ultimately affect the pipes causing leakage in the pipes leading to production loss, environmental damage, and/or safety issues. It may be necessary to periodically inspect the pipes for anomalies.

It may be extremely cumbersome to detect the anomalies in shielded pipes. The shielding may be removed to visually check for the presence of the anomalies. In some cases, removal of the shielding to check for anomalies may not be possible due to the environment in which they may be situated (for example, under water, closely clustered pipelines, underground). Also, removal of the shielding to visually check for anomalies in the pipe is time consuming and expensive. Furthermore, removal of the shielding may damage the pipes or expose the pipes to environmental factors, such as moisture, that may eventually cause anomalies.

Conventional approaches for detecting the anomalies include using visual and ultrasound thickness gauging of the pipe after manual removal of insulation, long range ultrasound testing, pulsed eddy current, digital radiography, and infrared imaging of the pipe, among others.

One of the common inspection techniques involves using pipelines which have an inner metal pipe and an outer metal cladding with insulation in-between employed as a coaxial waveguide. However, most of subsea pipelines, for example, do not have an external metal cladding and thus cannot be used as a coaxial waveguide directly. In such applications, if probes touch or pierce an insulation of the pipeline, insulation may be damaged causing an adverse impact on the pipeline.

There is a need for an enhanced system and method for detecting anomalies in pipes.

BRIEF DESCRIPTION

In accordance with one exemplary embodiment, a system for detecting an anomaly in a pipe assembly is disclosed. The system includes a plurality of movable members and an electromagnetic wave probe disposed within at least one movable member among the plurality of movable members. The actuation system is coupled to the plurality of movable members. The actuation system is configured to actuate and removably position the plurality of movable members to form a wave guide around at least a portion of an outer peripheral surface of the pipe assembly and position the electromagnetic wave probe proximate to the portion of the outer peripheral surface of the pipe assembly.

In accordance with another embodiment, a method is disclosed. The method involves actuating a plurality of movable members via an actuation system so as to removably position the plurality of movable members to form a wave guide around at least a portion of an outer peripheral surface of a pipe assembly. The method further involves activating an electromagnetic wave probe disposed within at least one movable member among the plurality of movable members, for transmitting a plurality of electromagnetic waves to the portion of the outer peripheral surface of the pipe assembly. The electromagnetic wave probe is located proximate to the portion of the outer peripheral surface of the pipe assembly. The method also involves receiving a plurality of reflected electromagnetic waves from the portion of the outer peripheral surface of the pipe assembly via the electromagnetic wave probe. The method further involves detecting an anomaly in the pipe assembly based on the plurality of reflected electromagnetic waves via a processor.

In accordance with yet another embodiment, a computer readable medium, having instructions stored thereon which, when executed, causes a processor to perform a method is disclosed. The method involves actuating a plurality of movable members via an actuation system so as to removably position the plurality of movable members to form a wave guide around at least a portion of an outer peripheral surface of a pipe assembly. The method further involves activating an electromagnetic wave probe disposed within at least one movable member among the plurality of movable members, for transmitting a plurality of electromagnetic waves to the portion of the outer peripheral surface of the pipe assembly. The electromagnetic wave probe is located proximate to the portion of the outer peripheral surface of the pipe assembly. The method also involves receiving a plurality of reflected electromagnetic waves from the portion of the outer peripheral surface of the pipe assembly via the electromagnetic wave probe. The method further involves detecting an anomaly in the pipe assembly based on the plurality of reflected electromagnetic waves via a processor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In accordance with certain embodiments of the present invention, a system for detecting an anomaly in a pipe assembly is disclosed. The system includes a plurality of movable members and an electromagnetic wave probe disposed within at least one movable member among the plurality of movable members. Further, the system includes an actuation system coupled to the plurality of movable members. The actuation system is configured to actuate and removably position the plurality of movable members to form a waveguide around at least a portion of an outer peripheral surface of the pipe assembly and position the electromagnetic wave probe proximate to the portion of the outer peripheral surface of the pipe assembly. In accordance with certain other embodiments, a method for detecting an anomaly in a pipe assembly is disclosed. In accordance with yet another embodiment, a computer readable medium, having instructions stored thereon which, when executed, causes a processor to perform a detection method, is disclosed. In accordance with the embodiments of the present invention, a removable electromagnetic waveguide is formed around a pipe assembly that enables propagation of electromagnetic energy and hence facilitates inspection of a non-cladded insulated pipe assembly.

Figure 1:
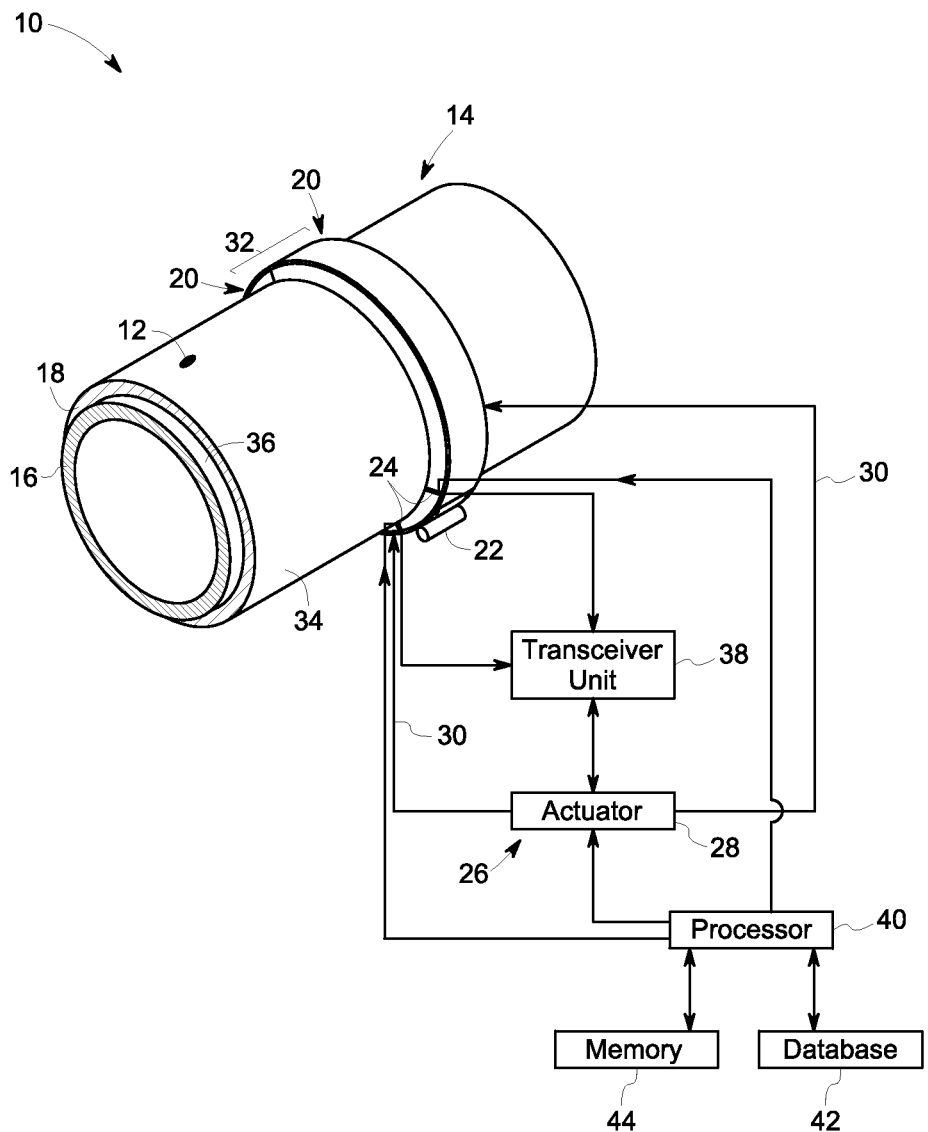
FIG. 1 is a perspective view of a system for detecting an anomaly in a pipe assembly in accordance with an exemplary embodiment.

Referring to FIG. 1, a perspective view of a system 10 for detecting an anomaly 12 in a pipe assembly 14 is illustrated. The illustrated pipe assembly 14 includes a metallic pipe 16 and an insulation layer 18 coated on the metallic pipe 16. The pipe assembly 14 may be used in industries, such as for example, the chemical industry, petroleum industry, and the like for transportation of materials such as chemicals, fuels, or the like. The pipe assembly 14 may be laid under water, under soil, or on land. The metallic pipe 16 may be made of iron, steel, or the like. The insulation layer 18 may be made of polypropylene, polyethylene, or other plastic materials or common insulation materials such as glass wool, mineral wool.

The insulation layer 18 is used to protect the metallic pipe 16 from anomalies such as corrosion, material degradation, moisture ingress, physical damages, and the like. Despite the provision of the insulation layer 18, one or more anomalies may occur in the pipe assembly 14 due to various reasons including damages in the insulation layer 18, environmental factors, prior existence of corrosion factors within the insulation layer 18, and external forces, among others. The anomalies may eventually degrade and ultimately affect the pipe assembly 14. In the illustrated embodiment, the system 10 is used for detecting the presence of the anomaly 12 in the pipe assembly 14. It should be noted herein that although a circular pipe assembly 14 is shown, the system 10 is also applicable for pipe assemblies having other shapes. In other embodiments, the system 10 is also applicable for a non-insulated pipe.

The system 10 includes a plurality of movable members 20 coupled to each other via a hinge 22. Although two movable members 20 are shown, in other embodiments, the number of movable members may vary depending upon the application. In other words, the system 10 may include more than two movable members interconnected to each other via hinges. In the illustrated embodiment, the movable members 20 are semi-circular shaped. In other embodiments, the shape of the movable members may vary depending on the shape of the pipe assembly and the application.

In the illustrated embodiment, the system 10 includes an electromagnetic wave probe 24 disposed in each movable member 20. In one embodiment, the system 10 may include only one electromagnetic wave probe 24 disposed in one movable member among the plurality of movable members 20. In another embodiment, a plurality of electromagnetic wave probes 24 is disposed in each movable member 20. It should be noted herein that the plurality of electromagnetic wave probes 24 is disposed completely within each movable member 20. In some other embodiments, the number of electromagnetic wave probes 24 and the number of movable members 20 accommodating the electromagnetic wave probes 24 may vary depending on the application. The spacing between the plurality of electromagnetic wave probes 24 may also vary depending on the application.

In the illustrated embodiment, an actuation system 26 is coupled to the plurality of movable members 20. Specifically, the actuation system 26 includes an actuator 28 coupled to the plurality of movable members 20 via a plurality of links 30. The actuator 28 is configured to actuate and removably position the plurality of movable members 20 around a portion 32 of an outer peripheral surface 34 of the pipe assembly 14 during the detection process. Specifically, the plurality of movable members 20 is removably disposed around the portion 32 of the outer peripheral surface 34 of the insulation layer 18. The electromagnetic wave probes 24 are disposed proximate to the portion 32 of the outer peripheral surface 34 of the pipe assembly 14. The plurality of movable members 20 form a wave guide for propagation of the electromagnetic waves from the electromagnetic wave probes 24 to the portion 32 of the outer peripheral surface 34 of the pipe assembly 14 during the detection process. Further, the actuation system 26 is configured to move the plurality of movable members 20 to different positions along a longitudinal direction of the pipe assembly 14.

During operation, at one position along a longitudinal direction of the pipe assembly 14, the plurality of movable members 20 is moved to a closed position and removably disposed around the portion 32 of the outer peripheral surface 34 of the pipe assembly 14 via the actuation system 26. Once the detection process is completed at the position, the plurality of movable members 20 is moved to an open position and moved to another position along the longitudinal direction of the pipe assembly 14 via the actuation system 26. Then the actuation system 26 moves the plurality of movable members 20 to the closed position. The process is repeated for different positions along the longitudinal direction of the pipe assembly 14.

In another embodiment, the pipe assembly 14 does not include the insulation layer 18 on the metallic pipe 16. In such an embodiment, the plurality of movable members 20 is removably disposed around a portion of an outer peripheral surface 36 of the metallic pipe 16. The electromagnetic wave probes 24 are disposed proximate to the portion of the outer peripheral surface 36 of the metallic pipe 16.

In the illustrated embodiment, the electromagnetic wave probes 24 are communicatively coupled to a transceiver unit 38. The transceiver unit 38 is communicatively coupled to a processor 40. A database 42 and a memory 44 are communicatively coupled to the processor 40. The processor 40 controls the transceiver unit 38 to generate and receive electromagnetic waves through the electromagnetic wave probes 24. The processor 40 is further communicatively coupled to the actuator 28 and configured to control the actuator 28.

In one embodiment, the processor 40 controls a first electromagnetic wave probe 24 to transmit a plurality of first electromagnetic waves toward a second electromagnetic wave probe 24. It should be noted herein that when it is mentioned that electromagnetic waves are transmitted towards a particular probe, it implies that electromagnetic waves may be transmitted in a unidirectional, bidirectional or omnidirectional manner where all or a portion of the transmitted electromagnetic waves reach the particular probe. In another embodiment, the processor 40 controls a signal generator (not shown in FIG. 1) to generate the plurality of first electromagnetic waves and transmit the plurality of first electromagnetic waves to the transceiver unit 38. The transceiver unit 38 may then transmit the plurality of first electromagnetic waves to the first electromagnetic wave probe 24. In yet another embodiment, the processor 40 may control the transceiver unit 38 to transmit a control signal to a signal generator to generate the plurality of first electromagnetic waves and transmit the generated first electromagnetic waves to the first electromagnetic wave probe 24. In one specific embodiment, the plurality of first electromagnetic waves may have continuous frequencies. For example, the plurality of first electromagnetic waves may include a chirp wave having a continuous wave of varying frequencies with respect to time. In another specific embodiment, the plurality of first electromagnetic waves may have discrete frequencies. For example, the plurality of first electromagnetic waves may include a series of electromagnetic waves, each electromagnetic wave having a different frequency. In yet another embodiment, the plurality of first electromagnetic waves may have both continuous and discrete frequencies.

The second electromagnetic wave probe 24 receives at least a portion of the plurality of first electromagnetic waves transmitted from the first electromagnetic wave probe 24. The portion as described herein may be any percentage of the plurality of first electromagnetic waves. In one embodiment, the received first electromagnetic waves may be a plurality of modified first electromagnetic waves. The modification may be caused because of a change in impedance at least due to the presence of the anomaly 12 within the pipe assembly 14.

The first electromagnetic wave probe 24 may also receive at least a portion of the reflected first electromagnetic waves. The reflection may be caused by a boundary between metallic pipe 16 and the insulation layer 18, the anomaly 12, for example. The two electromagnetic wave probes 24 transmit the received portion of the first electromagnetic waves to the transceiver unit 38. The transceiver unit 38 then transmits the received portions of the plurality of first electromagnetic waves to the processor 40.

Further, the processor 40 controls the second electromagnetic wave probe 24 to transmit a plurality of second electromagnetic waves toward the first electromagnetic wave probe 24. In another embodiment, the processor 40 controls a signal generator (not shown in FIG. 1) to generate the plurality of second electromagnetic waves and transmit the plurality of second electromagnetic waves to the transceiver unit 38. The transceiver unit 38 may then transmit the plurality of second electromagnetic waves to the second electromagnetic wave probe 24. In yet another embodiment, the processor 40 may control the transceiver unit 38 to transmit a control signal to a signal generator to generate the plurality of second electromagnetic waves and transmit the generated second electromagnetic waves to the second electromagnetic wave probe 24. In one specific embodiment, the plurality of second electromagnetic waves may have continuous frequencies. In another specific embodiment, the plurality of second electromagnetic waves may have discrete frequencies. In yet another specific embodiment, the plurality of second electromagnetic waves may have both continuous and discrete frequencies. The plurality of first electromagnetic waves and the second electromagnetic waves may be radio frequency (RF) waves or microwave waves or any other suitable high frequency waves.

The first electromagnetic wave probe 24 receives at least a portion of the transmitted second electromagnetic waves. The received second electromagnetic waves may be modified second electromagnetic waves. The modification may be caused because of a change in impedance at least due to the presence of anomaly 12. The second electromagnetic wave probe 24 may also receive a portion of reflected second electromagnetic waves. The reflections may be caused by the boundary between the metallic pipe 16 and the insulation layer 18, the anomaly 12, and the like. The two electromagnetic wave probes 24 transmit the received portion of the second electromagnetic waves to the transceiver unit 38. The transceiver unit 38 transmits the received second electromagnetic waves to the processor 40.

The received first and second electromagnetic waves may include signal components associated with a variety of reflections including reflections that are from outside a region of interest, components due to reflections at interface between the electromagnetic wave probes 24 and the pipe assembly 14, anomaly 12, and the like. The received electromagnetic waves may be processed to filter undesired components before application of the inverse Fourier transform to the received electromagnetic waves. The components associated with reflections from outside of a region of interest and components due to reflections at the interface between the electromagnetic wave probe 24 and the pipe assembly 14 may not be required or may be undesirable for detecting an anomaly.

Further, the processor 40 analyzes the received first electromagnetic waves, and/or the received second electromagnetic waves to identify the anomaly 12. The processor 40 identifies the responses associated with anomaly 12. The processor 40 may also identify a location of anomaly 12 on the pipe assembly 14 based upon the analysis. In one embodiment, the processor 40 may apply an inverse Fourier transform on the received first electromagnetic waves and the received second electromagnetic waves to determine a location of the anomaly 12. The processor 40 may apply the inverse Fourier transform, for example, when the signal to noise ratio of components associated with anomalies is high. In one embodiment, the anomaly 12 is detected in the insulation layer 18. In another embodiment, the anomaly 12 is detected on the outer peripheral surface 36 of the metallic pipe 16.

Upon identifying the location of the anomaly 12, the processor 40 may identify a signature of the anomaly 12 in the received first and second electromagnetic waves. In one embodiment, the signature may include real and imaginary components of the response associated with the anomaly 12.

In another embodiment, the signature may be a particular pattern or waveform shape associated with the anomaly 12 and may be defined by features such as number of peaks, number of valleys and their sequence. Other examples of signatures are also contemplated herein.

The processor 40 may compare the signature of the anomaly 12 with other signatures in the database 42. Further, the processor 40 may classify anomaly 12 into a corresponding anomaly category and/or false anomalies based upon the comparison. The false anomalies may be, for example, components that may not be associated with any anomaly. In one embodiment, processor 40 may use support vector machines (SVM) or artificial neural networks (ANN) for the comparison and the classification. Anomaly categories, for example, may include corrosion in the outer peripheral surface 36 of the metallic pipe 16, moisture ingress in the insulation layer 18, damage of the insulation layer 18, leakage in the metallic pipe 16, void in the insulation layer 18, material degradation of the metallic pipe 16, the insulation layer 18, and the like.

Although, FIG. 1 illustrates an embodiment where two electromagnetic wave probes 24 are employed for detecting the anomaly 12, other embodiments where the number of probes employed may vary for detecting the anomaly 12 in the pipe assembly 14, are also contemplated herein.

The processor 40 is configured to operate in accordance with a plurality of instructions stored in the memory 44. The memory 44 may also be used for temporary or permanent storage of other data or information including configuration data. The processor 40 may include at least one arithmetic logic unit, general purpose controller or other processor arrays programmed to perform the desired computations. In one embodiment, the processor 40 is a custom device configured to perform functions of the system 10. In another embodiment, the processor 40 is a digital signal processor or a microcontroller. In some embodiments, other types of processors, operating systems, and physical configurations are envisioned. In one embodiment, the non-transitory computer readable storage medium encoded with a program or operating instructions, instructs the processor 40 to perform a statistical analysis of the received electromagnetic wave signals.

The memory 44 may be a non-transitory computer readable storage medium. For example, the memory 44 may be a dynamic random access memory (DRAM) device, a static random access memory (SRAM) device, flash memory, or other memory devices. In one embodiment, the memory 44 may include a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one embodiment, the memory 44 is an on-board memory of the processor 40.

Figure 2:
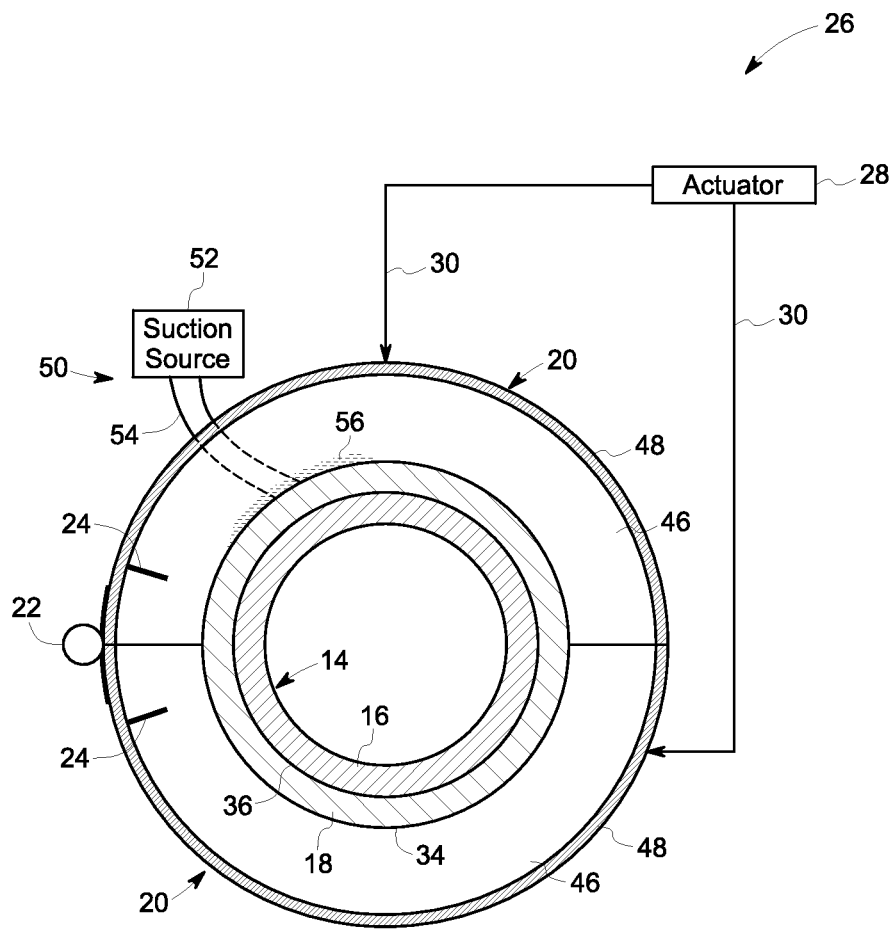
FIG. 2 is a sectional view of a system for detecting an anomaly in a pipe assembly in accordance with the embodiment of FIG. 1.

Referring to FIG. 2, a sectional view of the system 10 for detecting the anomaly 12 in the pipe assembly 14 in accordance with the embodiment of FIG. 1 is illustrated. The illustrated pipe assembly 14 includes the metallic pipe 16 and the insulation layer 18 coated on the metallic pipe 16. In the illustrated embodiment, the system 10 includes the electromagnetic wave probe 24 disposed in each movable member 20.

Each movable member among the plurality of movable members 20, includes a non-metallic layer 46 and a metallic layer 48 disposed on the non-metallic layer 46. The non-metallic layer 46 may be either made of the same material of the insulation layer 18 or a different material from the insulation layer 18. The metallic layer 48 may be made of iron, steel, or the like. The non-metallic layer 46 may be made of polypropylene, polyethylene, or other plastic materials. In the illustrated embodiment, the electromagnetic wave probe 24 is disposed in the non-metallic layer 46 of each movable member 20.

As discussed previously, the actuation system 26 is coupled to the plurality of movable members 20. Specifically, the actuation system 26 includes the actuator 28 coupled to the plurality of movable members 20 via the plurality of links 30. In the illustrated embodiment, the plurality of movable member 20 are coupled to each other via the hinge 22 and disposed in a closed position. The actuator 28 actuates and removably positions the plurality of movable members 20 around the portion 32 of the outer peripheral surface 34 of the insulation layer 18. The electromagnetic wave probes 24 are disposed proximate to the portion 32 of the outer peripheral surface 34 of the pipe assembly 14. The plurality of movable members 20 form a wave guide for propagation of the electromagnetic waves from the electromagnetic wave probes 24 to the portion 32 of the outer peripheral surface 34 of the insulation layer 18 of the pipe assembly 14.

Additionally, a liquid removal system 50 is coupled to at least one movable member among the plurality of movable members 20. In the illustrated embodiment, the liquid removal system 50 includes a suction source 52 and a pipe 54 coupled to the suction source 52 and disposed extending through the one movable member 20. As discussed previously, during operation, at one position along a longitudinal direction of the pipe assembly 14, the plurality of movable members 20 is moved to a closed position and removably disposed around the portion 32 of the outer peripheral surface 34 of the pipe assembly 14 via the actuation system 26. Once the detection process is completed at the position, the plurality of movable members 20 is moved to an open position and moved to another position along the longitudinal direction of the pipe assembly 14 via the actuation system 26. Then the actuation system 26 moves the plurality of movable members 20 to the closed position. A liquid 56 may be trapped between the plurality of movable members 20 and the pipe assembly 14 when the movable members 20 are switched between the open position and the closed position. The suction source 52 is configured to remove the liquid 56 trapped between the plurality of movable members 20 and the pipe assembly 14 when the plurality of movable members 20 is removably positioned around at least the portion 32 of the outer peripheral surface 34 of the pipe assembly 14.

Figure 3:
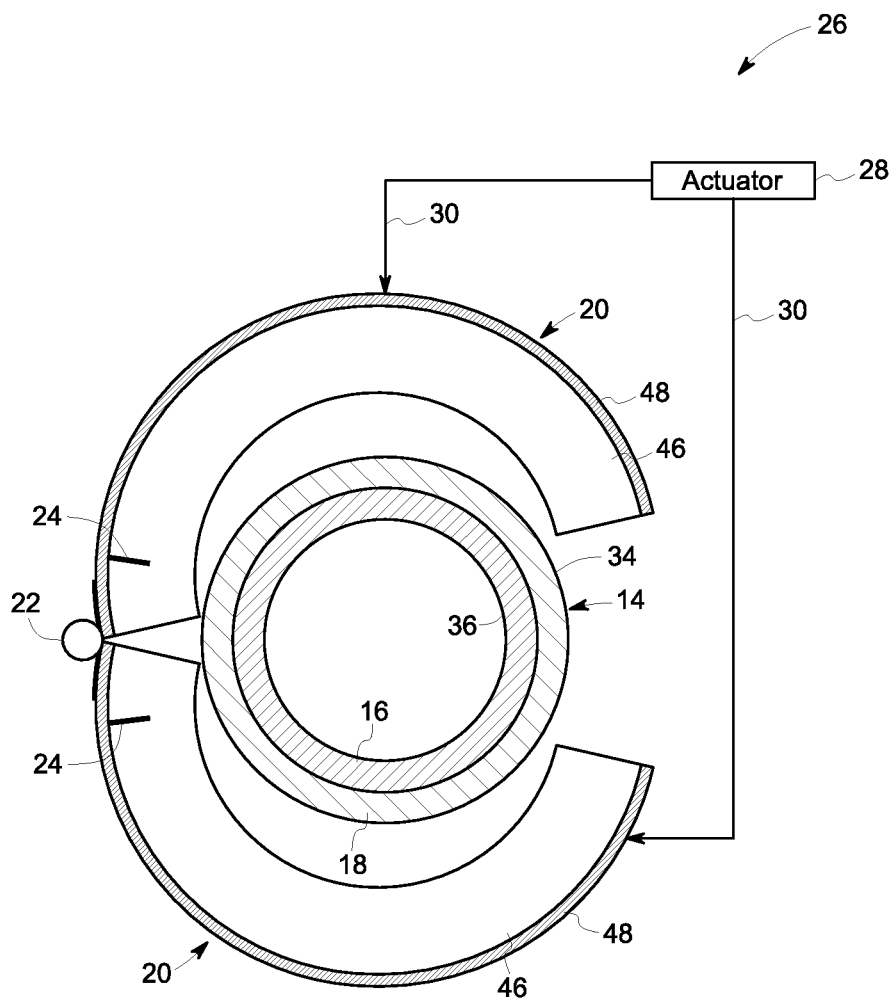
FIG. 3 is a sectional view of a system for detecting an anomaly in a pipe assembly in accordance with an exemplary embodiment.

Referring to FIG. 3, a sectional view of the system 10 for detecting the anomaly 12 in the pipe assembly 14 is illustrated. In the illustrated embodiment, the plurality of movable member 20 are coupled to each other via the hinge 22 and disposed in an open position.

One of the common inspection techniques involve using pipelines which have an inner metal pipe and an outer metal cladding with insulation in-between employed as a coaxial waveguide. Most of subsea pipelines, for example, do not have an external metal cladding and thus cannot be used as a coaxial waveguide directly. In such applications, probes should not touch or pierce an insulation of the pipeline because even small damage to the insulation may cause an adverse impact on the pipeline. In accordance with the embodiments of the present invention, the plurality of movable members 20 are deployed as a temporary coaxial waveguide that "clamps on" to the pipe assembly 14. The pipe assembly 14 forms an inner conductor and the plurality of movable members 20 forms an outer conductor. The insulation layer 18 of the pipe assembly 14 forms an inner section of a dielectric medium whereas the non-metallic layer 46 forms an outer section of a dielectric medium of the plurality of movable members 20. Such a dielectric media are transparent to electromagnetic waves at microwave frequencies. The electromagnetic wave probes 24 penetrates only the make shift wave guide formed around the pipe assembly 14. The make shift wave guide ensures enhanced coupling with the insulation layer 18 of the pipe assembly 14. Further, signal losses are reduced because the electromagnetic wave probes 24 do not touch the insulation layer 18 of the pipe assembly 14.

Figure 4:
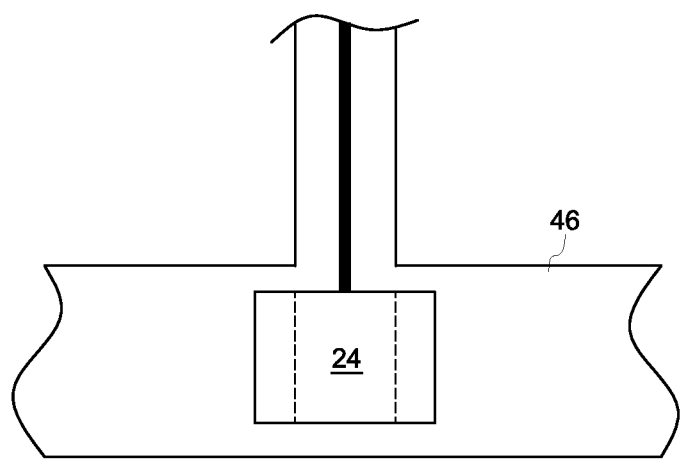
FIG. 4 is a schematic diagrammatical representation of an electromagnetic wave probe disposed in a movable member in accordance with an exemplary embodiment.

Referring to FIG. 4, a schematic diagrammatical representation of the electromagnetic wave probe 24 in accordance with an exemplary embodiment. The electromagnetic wave probe 24 is disposed in the non-metallic layer 46 of each movable member. In the illustrated embodiment, the electromagnetic wave probe 24 is a cylindrical electromagnetic wave probe. In one embodiment, the cylindrical electromagnetic wave probe has a radius equal an inner radius of a coaxial cable. In another embodiment, the cylindrical electromagnetic wave probe has a radius equal to an outer radius of a coaxial cable. In yet another embodiment, the cylindrical electromagnetic wave probe has a radius greater than an outer radius of a coaxial cable.

Figure 5:
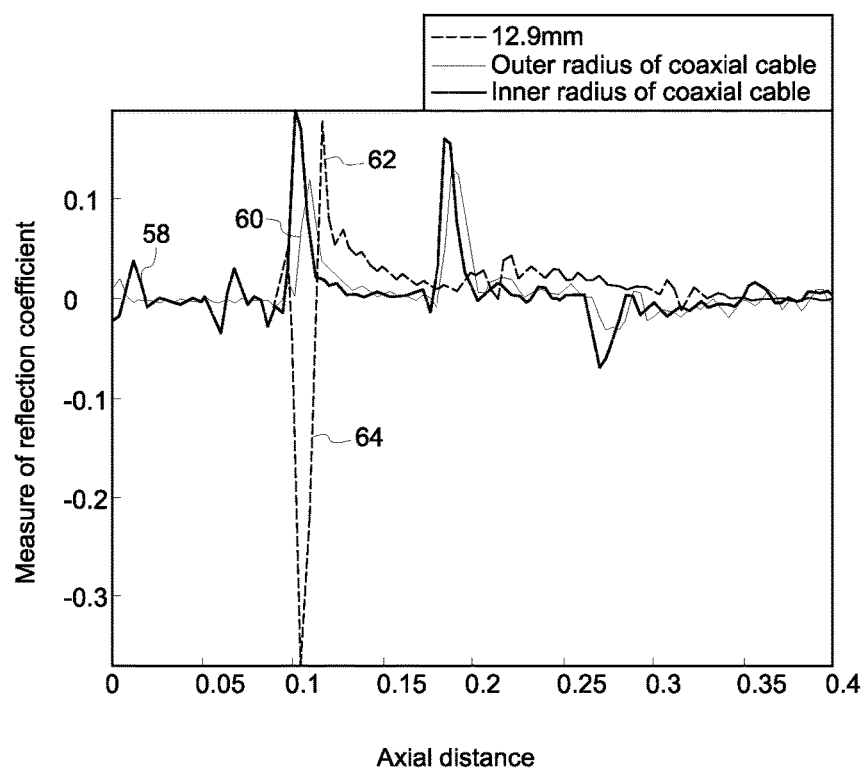
FIG. 5 is a graphical representation of a measure of reflection coefficient versus axial distance for a plurality of cylindrical electromagnetic wave probes having different radius in accordance with an exemplary embodiment.

FIG. 5 shows a graphical representation of a measure of reflection coefficient versus axial distance for a plurality of cylindrical electromagnetic wave probes having different radius in accordance with an exemplary embodiment. A curve 58 is representative of a measure of reflection for a cylindrical electromagnetic wave probe having a radius equal to an inner radius of a coaxial cable. A curve 60 is representative of a measure of reflection for a cylindrical electromagnetic wave probe having a radius equal to an outer radius of a coaxial cable. A curve 62 is representative of a measure of reflection for a cylindrical electromagnetic wave probe having a radius greater than an outer radius of a coaxial cable, for example, a radius of 12.9 millimeters.

The curve 60 is indicative of least reflection from a point of excitation due to good coupling characteristics. The curve 62 shows an imperfect short because the probe has a very large radius. The imperfect short is represented as a negative peak 64 of the curve 62, whose amplitude increases with increase in a radius of the cylindrical electromagnetic wave probe.

Figure 6:
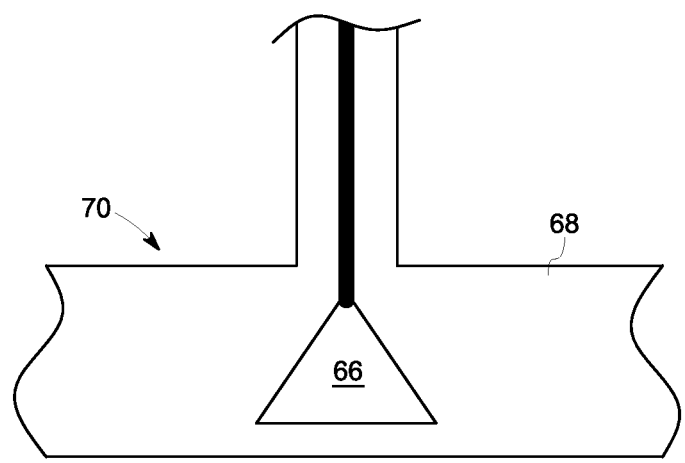
FIG. 6 is a schematic diagrammatical representation of an electromagnetic wave probe disposed in a movable member in accordance with another exemplary embodiment.

Referring to FIG. 6, a schematic diagrammatical representation of the electromagnetic wave probe 66 in accordance with another exemplary embodiment. The electromagnetic wave probe 66 is disposed in a non-metallic layer 68 of each movable member 70. In the illustrated embodiment, the electromagnetic wave probe 66 is a conical frustum electromagnetic wave probe. In one embodiment, the conical frustum electromagnetic wave probe 66 has a base radius equal to an outer radius of a coaxial cable. In another embodiment, the conical frustum electromagnetic wave probe 66 has a base radius greater than an outer radius of a coaxial cable.

Figure 7:
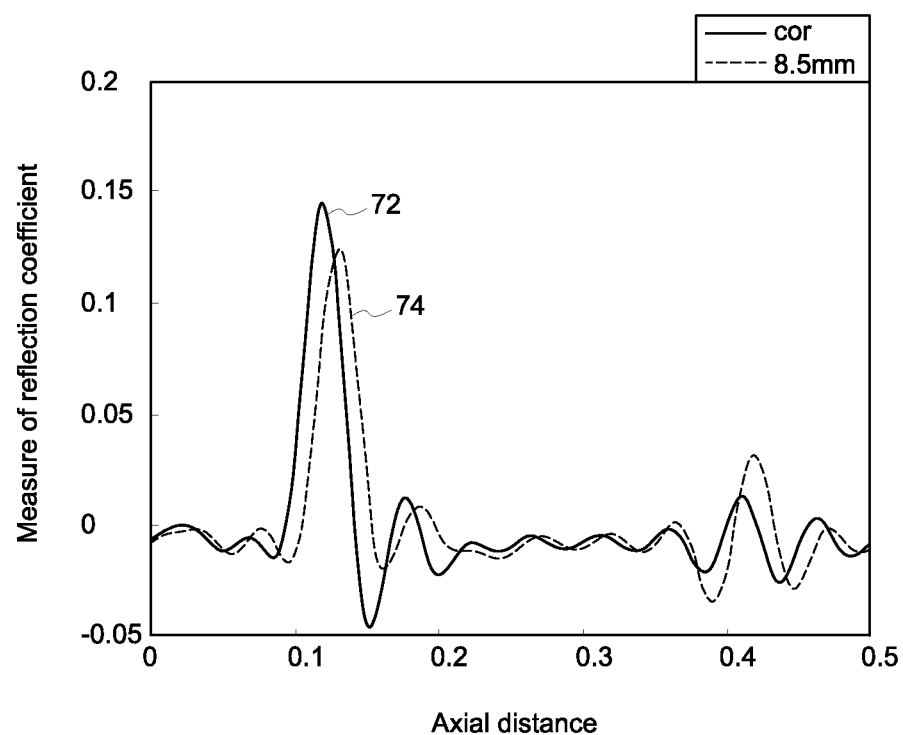
FIG. 7 is a graphical representation of a measure of reflection coefficient versus axial distance for a plurality of conical frustum electromagnetic wave probes having different base radius in accordance with an exemplary embodiment.

FIG. 7 shows a graphical representation of a measure of reflection coefficient versus axial distance for a plurality of conical frustum electromagnetic wave probes having different base radius in accordance with an exemplary embodiment. A curve 72 is representative of a measure of reflection for a conical frustum electromagnetic wave probe having a base radius equal to an outer radius of a coaxial cable. A curve 74 is representative of a measure of reflection for a conical frustum electromagnetic wave probe having a base radius greater than an outer radius of a coaxial cable, for example, a radius of 8.5 millimeters.

The curve 74 is indicative of a smaller reflection from a point of excitation and produces a better coupling compared to a conical frustum electromagnetic wave probe having a base radius equal to an outer radius of the coaxial cable. In the illustrated embodiment, the curve 74 has a peak portion at approximately 0.4 m of the axial distance representative of reflections from an anomaly. The peak portion at approximately 0.4 m of the axial distance is indicative of higher strength of the reflection from the anomaly.

Figure 8:
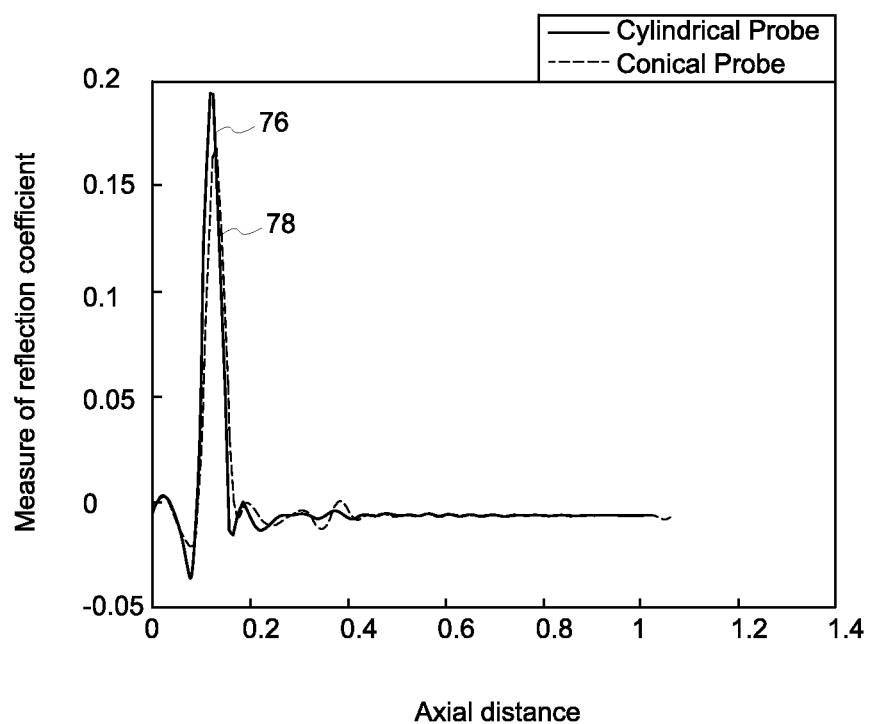
FIG. 8 is a graphical representation of a measure of reflection coefficient versus axial distance for a cylindrical electromagnetic wave probe and a conical frustum electromagnetic wave probe in accordance with an exemplary embodiment.

FIG. 8 shows a graphical representation of a measure of reflection coefficient versus axial distance for a cylindrical electromagnetic wave probe and a conical frustum electromagnetic wave probe having different base radius in accordance with an exemplary embodiment. A curve 76 is representative of a measure of reflection for a cylindrical electromagnetic wave probe. A curve 78 is representative of a measure of reflection of a conical frustum electromagnetic wave probe having a large base radius. The curve 78 is indicative of a smaller reflection at the point of excitation and produces an optimum coupling compared to a cylindrical electromagnetic wave probe design. In the illustrated embodiment, the curve 78 has a peak portion at approximately 0.4 m of the axial distance representative of reflections from an anomaly. The peak portion at approximately 0.4 m of the axial distance is indicative of higher strength of the reflection from the anomaly, which provides a better signal-to-noise-ratio from the conical frustum electromagnetic wave probe.

Figure 9:
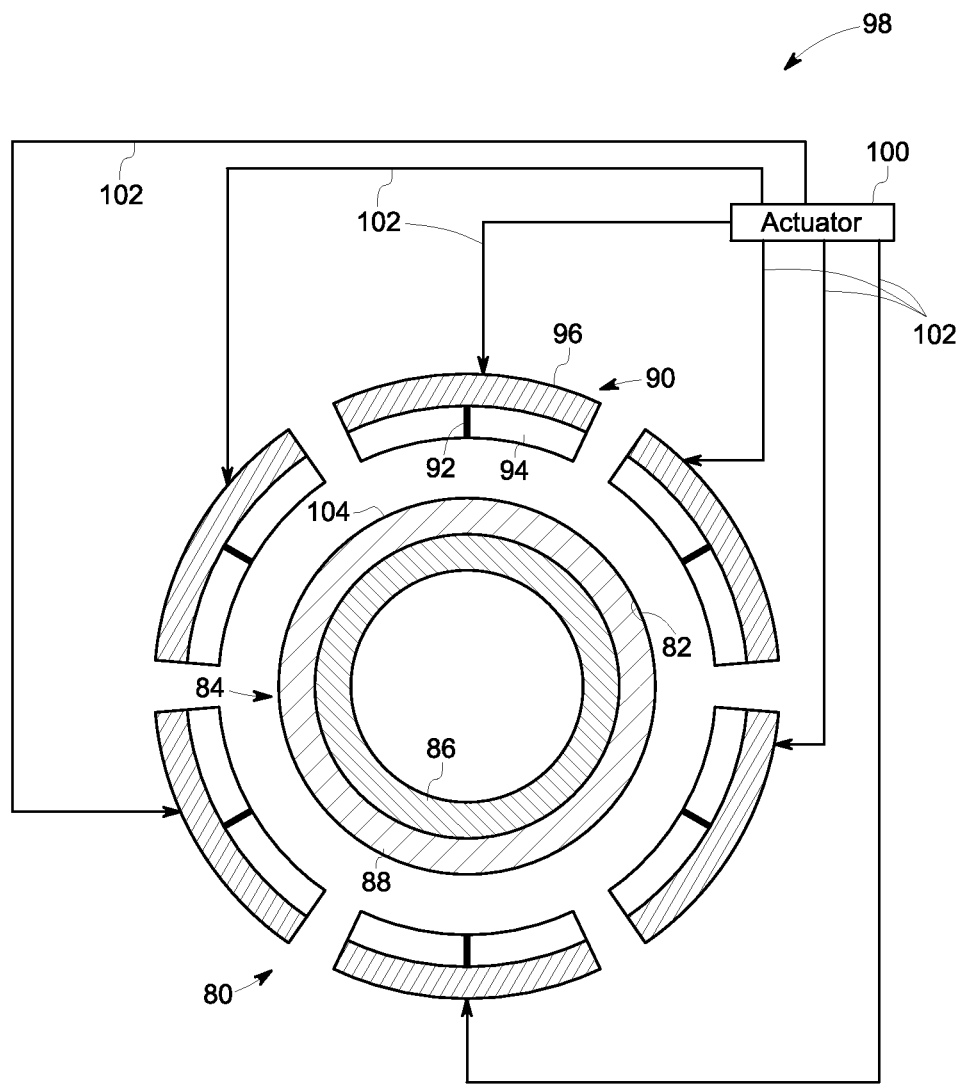
FIG. 9 is a schematic sectional view of a system for detecting an anomaly in a pipe assembly in accordance with another exemplary embodiment.

Referring to FIG. 9, a schematic sectional view of an exemplary system 80 for detecting an anomaly 82 in a pipe assembly 84 is illustrated. The illustrated pipe assembly 84 includes a metallic pipe 86 and an insulation layer 88 coated on the metallic pipe 86. In the illustrated embodiment, the system 80 includes a plurality of movable members 90 separated from each other and disposed in an open position. In the illustrated embodiment, the system 80 includes an electromagnetic wave probe 92 disposed in each movable member 90.

Each movable member among the plurality of movable members 90, includes a non-metallic layer 94 and a metallic layer 96 disposed on the non-metallic layer 94. In the illustrated embodiment, the electromagnetic wave probe 92 disposed in the non-metallic layer 94 of each movable member 90.

An actuation system 98 is coupled to the plurality of movable members 90. Specifically, the actuation system 98 includes an actuator 100 coupled to the plurality of movable members 90 via a plurality of links 102. Specifically, the actuator 100 actuates and removably positions the plurality of movable members 90 around a portion of an outer peripheral surface 104 of the insulation layer 88. The electromagnetic wave probes 92 are disposed proximate to the portion of the outer peripheral surface 104 of the insulation layer 88. The plurality of movable members 90 form a wave guide for propagation of the electromagnetic waves from the electromagnetic wave probes 92 to the portion of the outer peripheral surface 104 of the insulation layer 88.

As discussed previously, during operation, at one position along a longitudinal direction of the pipe assembly 84, the plurality of movable members 90 is moved to a closed position and removably disposed around the portion of the outer peripheral surface 104 of the pipe assembly 14 via the actuation system 98. Once the detection process is completed at the position, the plurality of movable members 90 is moved to an open position and moved to another position along the longitudinal direction of the pipe assembly 84 via the actuation system 98. Then the actuation system 98 moves the plurality of movable members 90 to the closed position.

In accordance with the embodiments discussed herein, the anomaly detection system is applicable specifically for inspection of insulated metallic pipes which do not have a cladding. A temporary, removable wave guide with one or more electromagnetic wave probes is provided without penetrating the pipe insulation. A time instant at which the reflected energy occurs is indicative of a location of the defect in the insulation layer or on a surface of the pipe under inspection. A phase of the reflected energy may provide details of the type of the defect. Signal processing algorithms may be used to enhance the signature of the reflected electromagnetic energy to accurately pinpoint the location of the defect. Further, operation of the pipeline need not be interrupted during the inspection process.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. A system for detecting an anomaly in a pipe assembly, the system comprising:
   a plurality of movable members;
   an electromagnetic wave probe disposed within at least one movable member among the plurality of movable members;
   an actuation system coupled to the plurality of movable members; wherein the actuation system is configured to actuate and removably position the plurality of movable members to form a wave guide around at least a portion of an outer peripheral surface of the pipe assembly and position the electromagnetic wave probe proximate to the portion of the outer peripheral surface of the pipe assembly; and
   a liquid removal system coupled to at least one movable member among the plurality of movable members and configured to remove a liquid between the plurality of movable members and the pipe assembly when the plurality of movable members is removably positioned around at least the portion of the outer peripheral surface of the pipe assembly.

2. The system of claim 1, wherein each movable member among the plurality of movable members, comprises a non-metallic layer and a metallic layer disposed on the non-metallic layer.

3. The system of claim 2, wherein the electromagnetic wave probe is disposed within the non-metallic layer of the at least one movable member among the plurality of movable members.

4. The system of claim 1, wherein the electromagnetic wave probe is a conical frustum electromagnetic wave probe.

5. The system of claim 1, wherein the electromagnetic wave probe is a cylindrical electromagnetic wave probe.

6. The system of claim 1, wherein the plurality of movable members comprises at least two movable members coupled to each other via a hinge.

7. The system of claim 1, wherein the plurality of movable members comprises at least two movable members separated from each other.

8. The system of claim 1, wherein the system is configured to detect the anomaly in an insulation layer of the pipe assembly, using an algorithm.

9. The system of claim 1, wherein the system is configured to detect the anomaly in the outer peripheral surface of a metallic pipe of the pipe assembly, using an algorithm.

10. The system of claim 1, further comprising a processor communicatively coupled to the actuation system and the electromagnetic wave probe.

11. A method comprising:
    actuating a plurality of movable members via an actuation system so as to removably position the plurality of movable members to form a wave guide around at least a portion of an outer peripheral surface of a pipe assembly;
    activating an electromagnetic wave probe disposed within at least one movable member among the plurality of movable members, for transmitting a plurality of electromagnetic waves to the portion of the outer peripheral surface of the pipe assembly; wherein the electromagnetic wave probe is located proximate to the portion of the outer peripheral surface of the pipe assembly;
    receiving a plurality of reflected electromagnetic waves from the portion of the outer peripheral surface of the pipe assembly via the electromagnetic wave probe;
    detecting an anomaly in the pipe assembly based on the plurality of reflected electromagnetic waves via a processor; and
    removing a liquid between the plurality of movable members and the pipe assembly via a liquid removal system coupled to at least one movable member among the plurality of movable members when the plurality of movable members is removably positioned around at least the portion of the outer peripheral surface of the pipe assembly.

12. The method of claim 11, wherein actuating a plurality of movable members further comprises actuating each movable member comprising a non-metallic layer and a metallic layer disposed on the non-metallic layer.

13. The method of claim 12, wherein activating an electromagnetic wave probe further comprises activating the electromagnetic wave probe disposed within the non-metallic layer of the at least one movable member among the plurality of movable members.

14. The method of claim 11, wherein actuating a plurality of movable members further comprises actuating at least two movable members coupled to each other via a hinge.

15. The method of claim 11, wherein actuating a plurality of movable members further comprises actuating at least two movable members separated from each other.

16. The method of claim 11, wherein detecting an anomaly further comprises detecting the anomaly in an insulation layer of the pipe assembly, using an algorithm.

17. The method of claim 11, wherein detecting an anomaly further comprises detecting the anomaly in the outer peripheral surface of a metallic pipe of the pipe assembly, using an algorithm.

18. The method of claim 11, wherein the anomaly comprises at least one of corrosion, material degradation, and moisture ingress.

19. A non-transitory computer readable medium, having instructions stored thereon which, when executed, causes a processor to perform a method, the method comprising:

actuating a plurality of movable members via an actuation system so as to removably position the plurality of movable members to form a wave guide around at least a portion of an outer peripheral surface of a pipe assembly;

activating an electromagnetic wave probe disposed within at least one movable member among the plurality of movable members, for transmitting a plurality of electromagnetic waves to the portion of the outer peripheral surface of the pipe assembly; wherein the electromagnetic wave probe is located proximate to the portion of the outer peripheral surface of the pipe assembly;

receiving a plurality of reflected electromagnetic waves from the portion of the outer peripheral surface of the pipe assembly via the electromagnetic wave probe;

detecting an anomaly in the pipe assembly based on the plurality of reflected electromagnetic waves; and removing a liquid trapped between the plurality of movable members and the pipe assembly via a liquid removal system coupled to at least one movable member among the plurality of movable members when the plurality of movable members is removably positioned around at least the portion of the outer peripheral surface of the pipe assembly.

* * * * *